(12) United States Patent
Hori

(10) Patent No.: US 7,311,404 B2
(45) Date of Patent: Dec. 25, 2007

(54) OPTICAL PROJECTION APPARATUS AND PROJECTION-TYPE IMAGE DISPLAYING APPARATUS

(75) Inventor: Hidehiko Hori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 139 days.

(21) Appl. No.: 11/003,596

(22) Filed: Dec. 6, 2004

(65) Prior Publication Data

US 2005/0206855 A1  Sep. 22, 2005

(30) Foreign Application Priority Data

Mar. 18, 2004  (JP) ............... 2004-078769

(51) Int. Cl.
*G03B 21/14* (2006.01)
(52) U.S. Cl. ............... 353/84; 348/743; 353/31
(58) Field of Classification Search ............. 353/84, 353/20, 31, 37, 34; 348/742, 743, 771; 349/5, 349/7
See application file for complete search history.

(56) References Cited

U.S. PATENT DOCUMENTS

| | | | | |
|---|---|---|---|---|
| 6,631,996 B2 * | 10/2003 | Moench et al. | ............... | 353/85 |
| 6,830,343 B2 * | 12/2004 | Song | ............... | 353/84 |
| 6,869,189 B2 * | 3/2005 | Kim et al. | ............... | 353/84 |
| 7,050,120 B2 * | 5/2006 | Allen et al. | ............... | 348/742 |
| 7,056,630 B2 * | 6/2006 | Kamei et al. | ............... | 430/7 |
| 2001/0055081 A1 | 12/2001 | Shigeta | | |
| 2002/0109821 A1 * | 8/2002 | Huibers et al. | ............... | 353/84 |
| 2004/0008288 A1 * | 1/2004 | Pate et al. | ............... | 348/742 |
| 2004/0135975 A1 * | 7/2004 | Wang | ............... | 353/84 |
| 2005/0030400 A1 | 2/2005 | Shigeta | | |
| 2005/0151936 A1 | 7/2005 | Nonaka | | |
| 2006/0274285 A1 * | 12/2006 | Pao | ............... | 353/84 |
| 2007/0064161 A1 * | 3/2007 | Takeda | ............... | 348/743 |

FOREIGN PATENT DOCUMENTS

| | | |
|---|---|---|
| JP | 9-54267 A | 2/1997 |
| JP | 2002-006395 A | 1/2002 |
| JP | 2002-122805 A | 4/2002 |
| JP | 2003-209854 A | 7/2003 |
| JP | 2004-294985 A | 10/2004 |
| JP | 2005-203859 A | 7/2005 |

* cited by examiner

*Primary Examiner*—William C. Dowling
(74) *Attorney, Agent, or Firm*—Birch, Stewart, Kolasch & Birch, LLP

(57) ABSTRACT

A projection-type image displaying apparatus includes: a first color wheel for splitting a light ray from a light source into colored light rays according to color transmission characteristics by the wheel being rotated; a second color wheel for further splitting the colored light rays from the first color wheel by the wheel being rotated; a reflection display device for reflecting, while modulating or switching the light rays transmitted through the second color wheel in synchronization with image signals from an image signal inputting unit, and varying phase of the color wheels in accordance with the changing picture quality; and a reflection drive control unit for controlling the driving of the reflection display device.

14 Claims, 12 Drawing Sheets

OPTICAL PROJECTION APPARATUS AND PROJECTION-TYPE IMAGE DISPLAYING APPARATUS

BACKGROUND OF THE INVENTION

1. Field of the Invention

The present invention relates to color wheels for time-divisionally splitting white light ray emitted from a lamp light source into red, green and blue light rays, and relates to an optical projection apparatus and projection-type image displaying apparatus having the optical projection apparatus that emits colored light rays transmitted through the color wheels onto a reflection display device, and magnifies to project the image light rays formed on the reflection display device through a projection lens onto a screen.

2. Description of the Related Art

An optical system of a conventional optical projection apparatus includes: a lamp device for emitting white condensed light rays; a color wheel for inputting the condensed light from the lamp device and splitting the light into colored light rays in a time-divisional manner; a light mixing element for inputting the colored light rays transmitted through the color wheel and emitting from an output facet the light as a beam whose cross sectional illumination distribution is uniform; a relay lens for refracting the colored light rays emitted from the light mixing element; a digital micromirror device (hereinafter, referred to as a DMD) for inputting the colored light rays transmitted through the relay lens and reflecting image light rays after the light rays being modulated or switched in accordance with image signals; and a projection lens for magnifying and projecting the image light rays onto a screen (for example, refer to Patent Document 1). Here, the output facet of the light mixing element and the DMD are designed to have optically conjugate relationships. The color wheel used in the conventional optical system comprise three color (three primary colors; red, green, blue) or four color (add white color) filter segments having sector-like shapes and different color transmission characteristics with respect to light rays transmitting therethrough, and the wheel is configured in a disk form in which the filter segments are glued with each other. Here, the reason for the color wheel comprising at least three primary color filter segments is that since the color information of the colored light rays transmitted through the color wheel is uniform due to the nature of light, when a light spot in an arbitrary position on the color wheel is lapped along a circumferential direction on the color wheel, the circumferential integration value of the colored light rays transmitted through the point becomes white. Moreover, the reason for adding a white filter segment is that since the light transmitted through a white color filter segment has light quantity three times as much as the light rays transmitted through each of the three primary color segments, the four color filter segment is suited to improve visibility of white characters and to project images onto the screen in bright surroundings.

The conventional projection-type image displaying apparatus includes: the optical projection apparatus described above; a control unit for controlling rotation of a color wheel in synchronization with a frame rate of image signals inputted from outside; a sensor for outputting reference signals in synchronization with the rotation of the color wheel; a DMD control circuit for inputting the reference signals outputted from the sensor and controlling light modulation or switching process for the DMD; and a memory for inputting color data, which is corresponding to the color of colored light rays incident on the DMD, and transmitting the color data to the DMD based on the control signals from the DMD control circuit (for example, refer to patent document 2).

A method of projecting image based on image signals, which is inputted from outside, onto the screen using the projection-type image displaying apparatus configured as above has been proposed in that rotational velocity of the color wheel is controlled so as to synchronize the velocity with the frame rate, when the frame rate of the inputted image signals is detected. When white condensed light emitted from a lamp device is incident on three or four color filter segments on the color wheel in rotation, the condensed light transmitted through the color wheel is changed into a red light ray (hereinafter, referred to as "R"), a green light ray (hereinafter, referred to as "G"), a blue light ray (hereinafter, referred to as "B"), and a white light ray (hereinafter, referred to as "W"), which are split in time division based on distribution of each filter segment. The colored light rays split in time division are emitted from the light mixing element as a beam, whose cross-sectional illumination distribution is uniform, refracted by the relay lens, and then sequentially illuminate the DMD. At this time, if a reference signal is transmitted from the sensor in synchronization with the rotation of the color wheel, the DMD control circuit sequentially reads from the memory for color data of image signals corresponding to R, G, B, and W illuminating the DMD, based on the reference signal, and simultaneously transmits to the DMD control signals for light modulation or switching process. The DMD modulates or switches the colored light rays at an extremely high speed based on the control signals from the DMD control circuit, and reflects to the projection lens R, G, B, and W image light rays corresponding to the image signals. The R, G, B, and W image light rays, which are inputted from the DMD, are sequentially magnified and projected onto the screen by the projection lens. Here, if alternating rate of the colors is rapid enough, the colors are composed in viewer's brains and recognized as full-color images. Thereby, magnified images are projected onto the screen by using a spectrum effect of human eyes. Therefore, because the projection-type image displaying apparatus uses a spectrum effect of human eyes, it can be empirically concluded that the more splitting counts, that is, the shorter splitting time is, when the white light ray from the light source is split into R, G, and B light rays in time division, the more excellent the color display becomes.

Patent Document 1:
  Japanese Laid-Open Open Patent Publications 2002-122805 (FIG. 1)

Patent Document 2:
  Japanese Laid-Open Open Patent Publications 1997-054267 (FIG. 2)

SUMMARY OF THE INVENTION

Problems to be Solved by the Invention

However, because a conventional optical projection apparatus and projection-type image displaying apparatus employing the optical projection apparatus are configured in such a way that one color-wheel is rotated and colored light rays are obtained in time division as described above, if a color wheel that has, for example, three primary color filter segments is used, each filter segment transmits only its predetermined colored light ray and reflects remaining colored light rays, and consequently, the intensity of light from a light source is reduced to one third of that at the color wheel. For this reason, only one ray out of three primary color light rays is used at all times due to the time divisional manner in the reflection display device, and the light utilization efficiency with respect to the total light of the lamp source is at most one third when the white color that is the same as the lamp source is reproduced. Therefore, in the projection-type image displaying apparatus that consists of one color wheel having three primary color filter segments, there have been problems in that light emitted from the lamp source can not be used effectively resulting in images displayed on a screen being dark.

In order to solve the above-described problems, a method has been conventionally used, in which one color wheel having filter segments for four colors, which are the three primary colors plus white, is employed in the projection-type image displaying apparatus In this case, because the white filter segment transmits all R, G, and B light rays, the white light ray transmitted through the segment have light quantity three times as much as the light rays transmitted through each of the three primary color segments. The images displayed on the screen become bright by W light ray illuminating the DMD and by R, G, and B color images being sequentially displayed on the screen. Moreover, a method has been conventionally used, in which brightness of image is increased by adding W light ray transmitted through the color wheel, when a color image, which is made, based on the same principle, by mixing all three primary colors, R, G, and B, is displayed.

However, in the conventional projection-type image displaying apparatus employing one color wheel with four color filter segments, there have been problems in that, when the color in which mixing ratios of R, G, and B rays are different from each other, for example, a reddish W ray in which the ratio of R ray is higher than the ratios of G and B rays, is desired, if a W ray transmitted through the white filter segment is further added to the reddish W, the image displayed on the screen consequently turns out to be a W ray with low R ray mixing ratio, and images displayed on the screen consequently become different from those corresponding to the image signals inputted into the projection-type image displaying apparatus.

As described above, using a color wheel having a white filter segment, the wider the area of this white filter segment is made, the higher becomes the ratio of the W ray with respect to the transmitted light rays from the color wheel; therefore the images displayed on the screen can be made brighter. On the other hand, as a result of mixing ratio of the W ray increasing, regarding colors except for the W ray, the color difference between image signals inputted into the projection-type image displaying apparatus and what is actually displayed on the screen thereof becomes great. As described above, because the images, in which only one characteristic of either color brightness or color repeatability is emphasized, are displayed on the screen in the conventional projection-type image displaying apparatus, when the apparatus is used, for example, as a data projector that needs color brightness as a need of an operator, if color brightness is not reproduced, it is impossible to properly recognize data on the screen; as a result, the apparatus will not be easy-to-use, even if color repeatability is ensured. Moreover, when the apparatus is used as an indoor image projector in which color realization is requested, even if color brightness is ensured, color repeatability will be lost because R, G, and B light ray areas are relatively decreased.

The present invention has been made in order to solve above problems, and to provide an optical projection apparatus and a projection-type image displaying apparatus incorporating the optical projection apparatus that can reversibly change picture quality displayed on its screen, between color brightness enhanced and color repeatability enhanced mode in accordance with external environment or operator's applications.

Means for Solving the Problems

A projection-type image displaying apparatus related to the present invention includes: a lamp device emitting white condensed light; a first color wheel that is configured in a disk form with filter segments having different color transmission characteristics from each other and splits into colored light rays the white light inputted from the lamp device; a second color wheel that is similarly configured in a disk form with filter segments having different color transmission characteristics from each other and splits into the same or other colored light rays the colored light transmitted through the first color wheel; an optical projection apparatus that includes a reflection display device for forming image light by modulating or switching the colored light rays transmitted from the second color wheel; a image signal inputting unit for inputting image signals inputted from outside; a synchronizing device for controlling the first color wheel and the second color wheel to synchronously rotate in a predefined phase; a reflection drive control unit for controlling the driving of the reflection display device; a memory for sending stored image signals to the reflection display device; and a picture-quality-change-signal inputting unit for transmitting to the synchronizing device picture quality changing signals.

Because the projection-type image displaying apparatus related to the present invention includes a first color wheel, a second color wheel and a synchronizing device for controlling the first color wheel and the second color wheel to synchronously rotate, and the W area in color the transmission characteristics of the color wheels has been made increasable/decreasable in such a way that the phase between the two color wheels comes to a predetermined value by the synchronizing device based on inputted signals from the picture-quality-change-signal inputting unit, a time-divisional pattern of the colored light rays incident on the reflection display device can be changed, and consequently, images displayed on the screen can be reversibly changed between color brightness enhanced and color repeatability enhanced mode.

DESCRIPTION OF THE SYMBOLS

"1" is an optical projection apparatus, "2" is a lamp device, "2a" is a lamp source, "2b" is a lamp reflector, "31" is a first color wheel, "31a" is a red filter segment, "31b" is a green filter segment, "31c" is a blue filter segment, "31d" is a white filter segment, "31e" is a spot, "31f" is a locus, "31g" is a reference line, "32" is a second color wheel, "32a" is a red filter segment, "32b" is a green filter segment, "32c" is a blue filter segment, "32d" is a white filter segment, "32e" is a spot, "32f" is a locus, "32g" is a reference line, "41" is driving means, "42" is driving means, "5" is a light mixing element, "6" is an optical system for focusing light rays, "7" is a reflection display device, "8" is a projection lens, "9" is a projection-type image displaying apparatus, "10" is an image signal inputting unit, "11" is a synchronizing device, "111" is a frame rate detecting unit, "112" is a motor control unit, "113" is a phase instruction unit, "114" is a synchronization detecting unit, "114a" is a photo sensor, "114b" is a photo sensor, "12" is a reflection drive control unit, "13" is a memory, and "14" is a picture-quality-change-signal inputting unit.

DETAILED DESCRIPTION OF THE PREFERRED EMBODIMENTS

Embodiment 1

Figure 1:
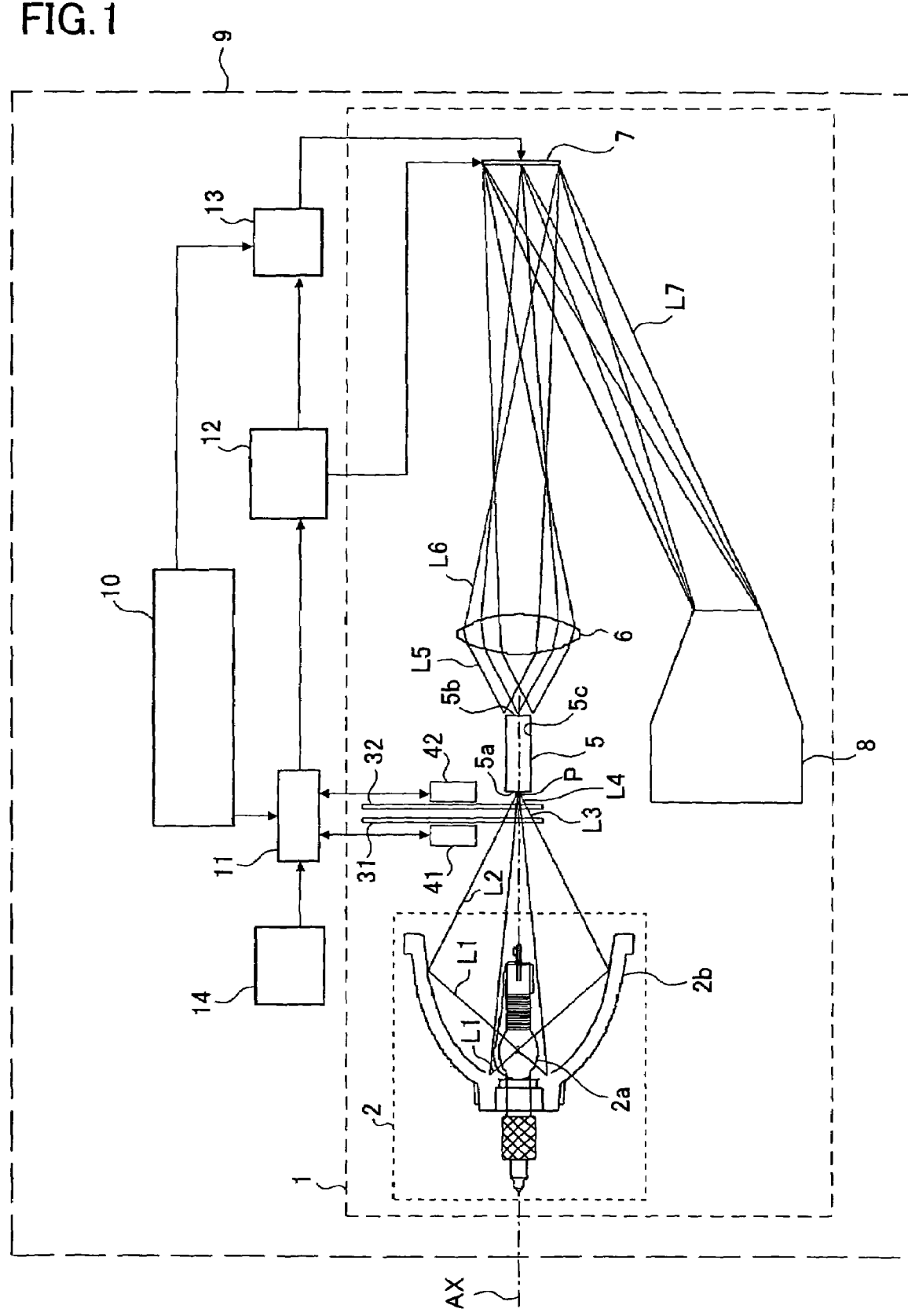
FIG. 1 is a schematic block diagram illustrating a configuration of an optical projection apparatus and a projection-type image displaying apparatus according to Embodiment 1 of the invention.
Figure 2:
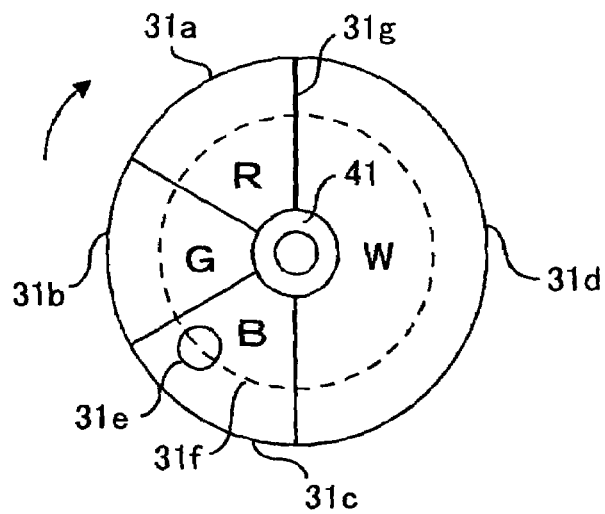
FIG. 2 is an elevation view illustrating a first color wheel in the starting state illustrated in FIG. 1.
Figure 3:
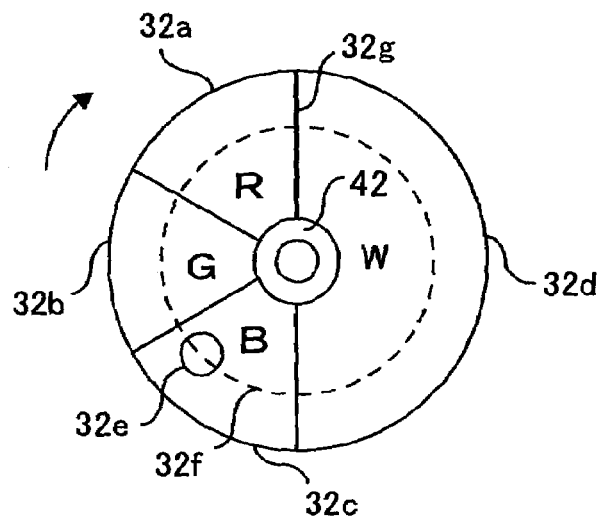
FIG. 3 is an elevation view illustrating a second color wheel in the starting state illustrated in FIG. 1.
Figure 4:
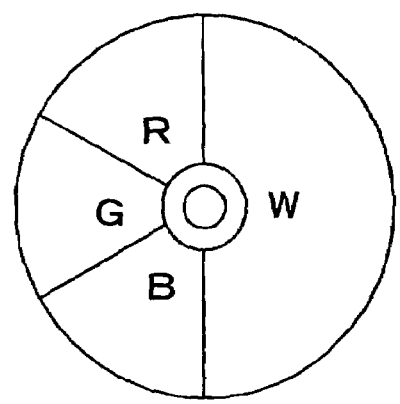
FIG. 4 is a view in which the color transmission characteristics of the two color wheels in FIG. 2 and FIG. 3 are superposed.
Figure 5:
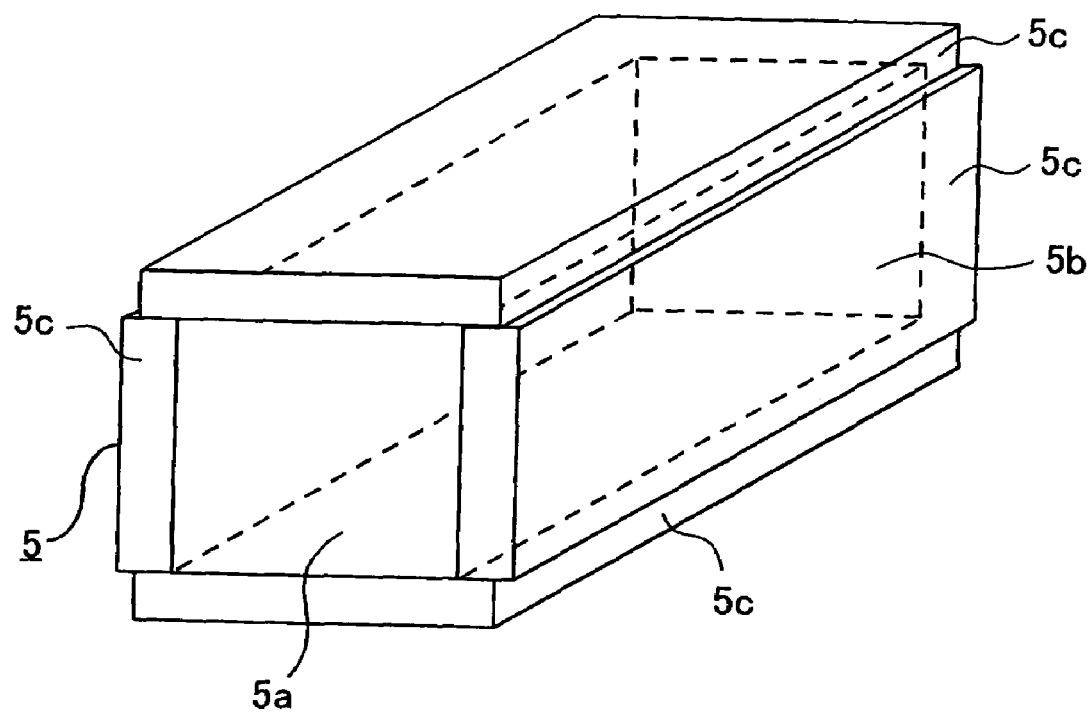
FIG. 5 is an oblique perspective view illustrating a schematic structure of a light mixing element illustrated in FIG. 1.
Figure 6:
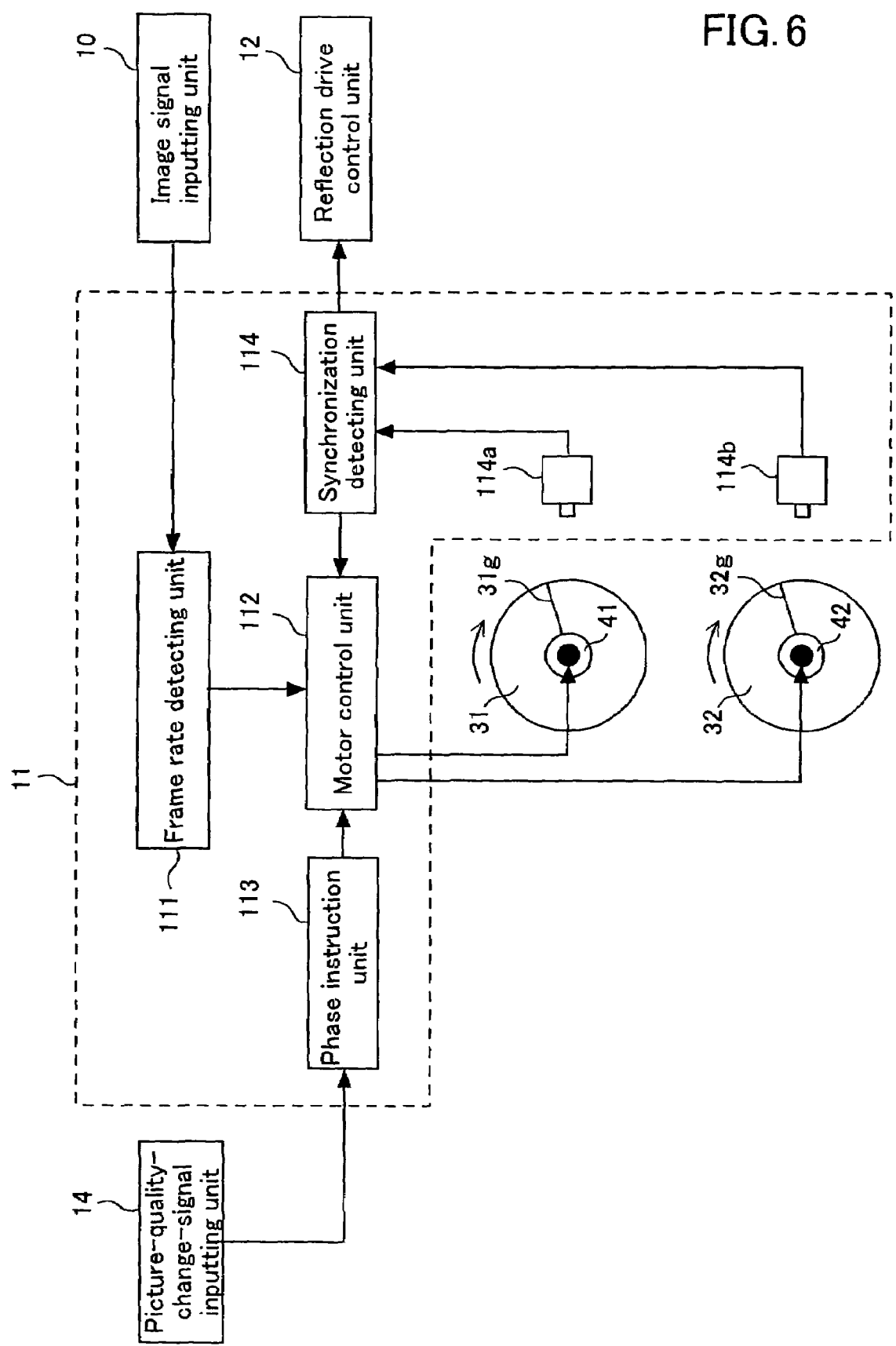
FIG. 6 is a block diagram illustrating a control system of a synchronizing device illustrated in FIG. 1.
Figure 7:
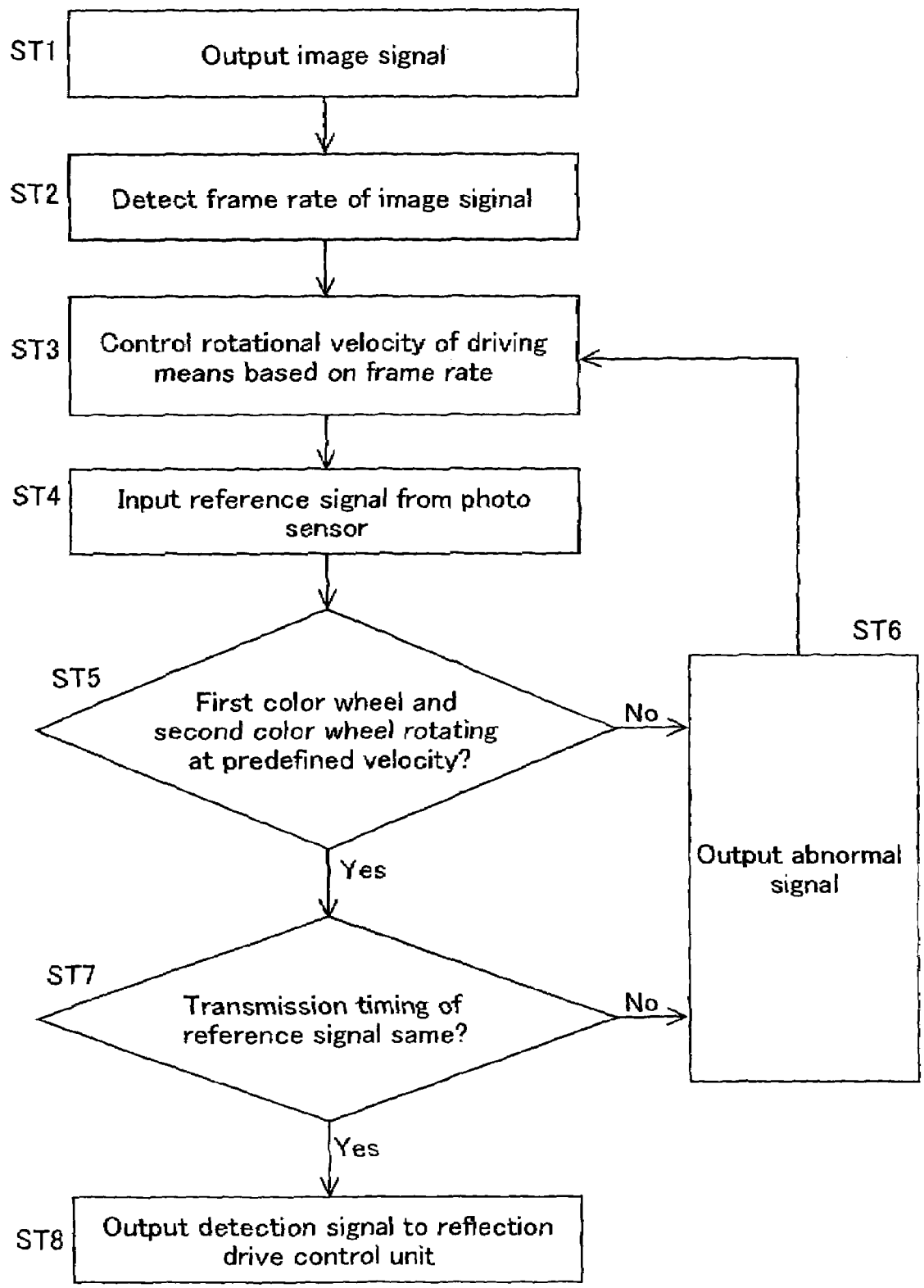
FIG. 7 is a flow chart for-explaining a control operation after stating the synchronizing device illustrated in FIG. 6.
Figure 8:
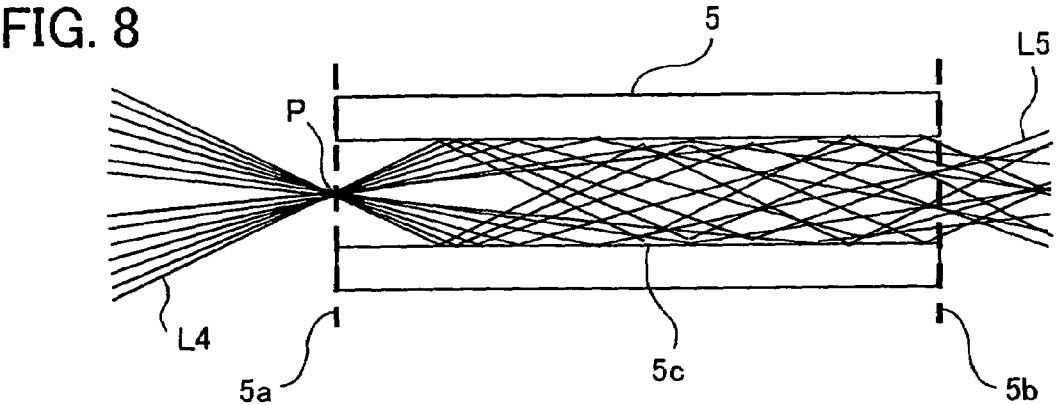
FIG. 8 is a view for explaining the function of the light mixing element illustrated in FIG. 1 and FIG. 5.
Figure 9:
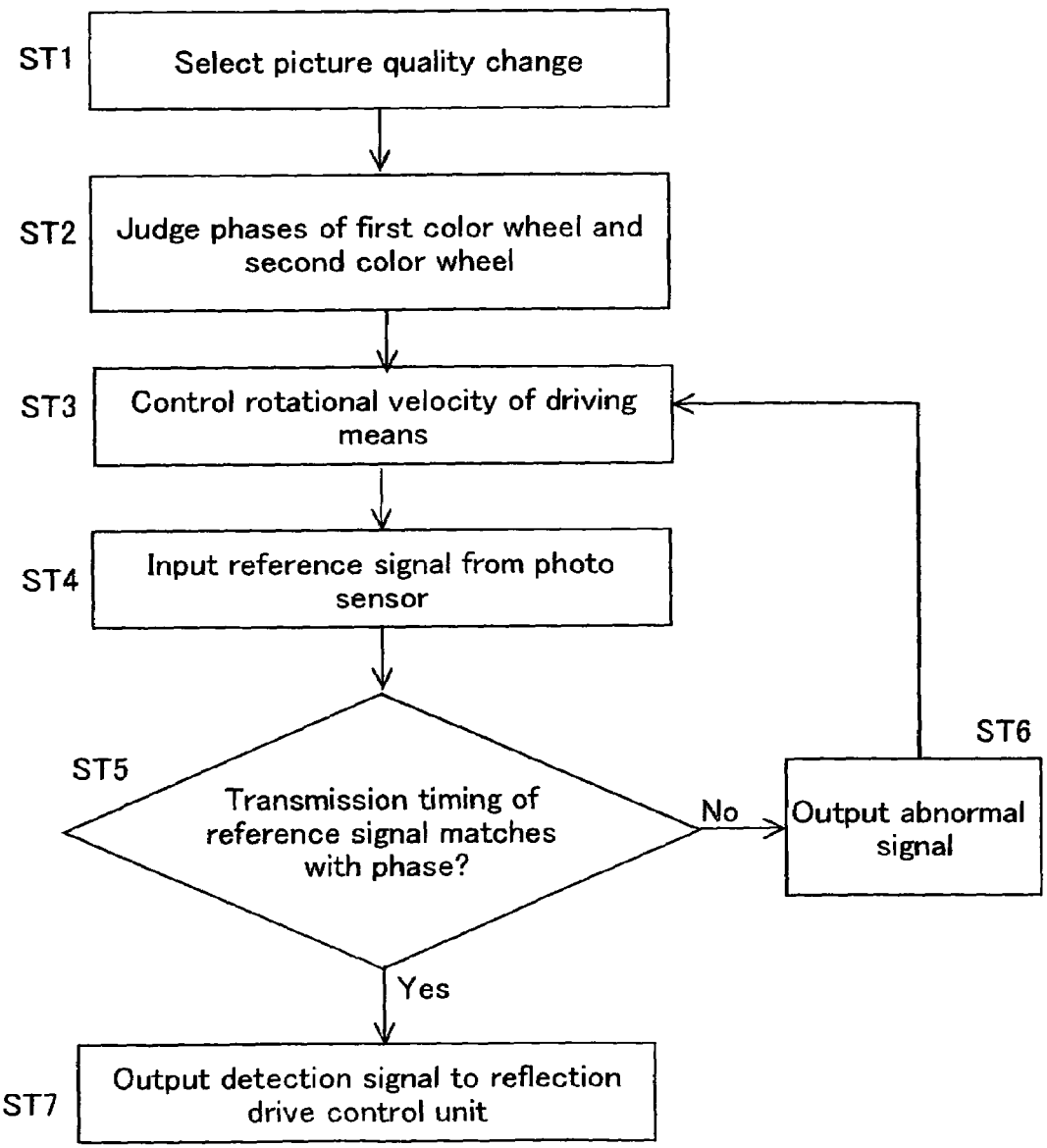
FIG. 9 is a flow chart for explaining the control operation after changing picture quality of the synchronizing device illustrated in FIG. 6.
Figure 10:
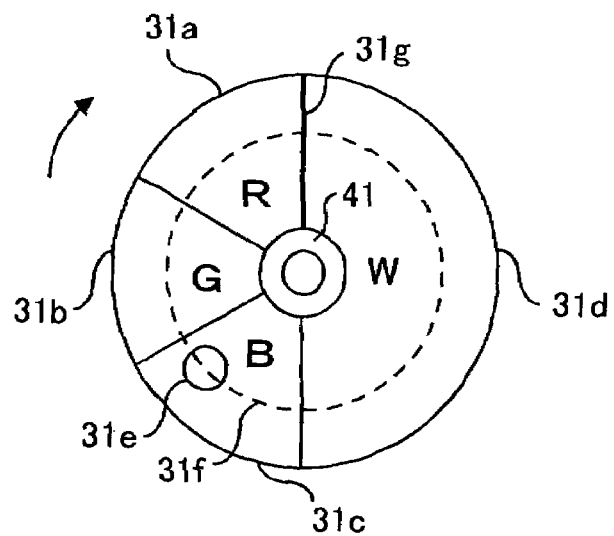
FIG. 10 is a view illustrating a state after changing the picture quality of the first color wheel illustrated in FIG. 2.
Figure 11:
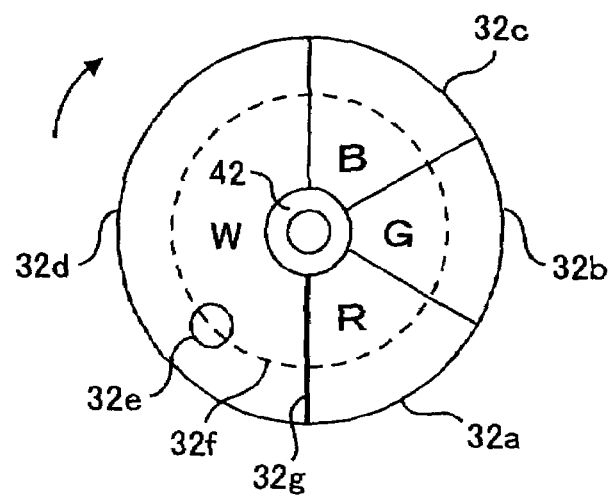
FIG. 11 is an elevation view illustrating a state after changing the picture quality of the second color wheel illustrated in FIG. 3.
Figure 12:
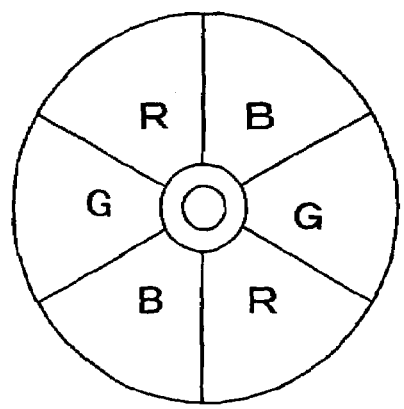
FIG. 12 is a view in which the color transmission characteristics of the two color wheels in FIG. 10 and FIG. 11 are superposed.

FIG. 1 is a schematic block diagram illustrating a configuration of an optical projection apparatus and a projection-type image displaying apparatus according to Embodiment 1 of the invention;

FIG. 2 is an elevation view illustrating a first color wheel in the starting state illustrated in FIG. 1;

FIG. 3 is an elevation view illustrating a second color wheel in the starting state illustrated in FIG. 1;

FIG. 4 is a view in which the color transmission characteristics of the two color wheels in FIG. 2 and FIG. 3 are superposed;

FIG. 5 is an oblique perspective view illustrating a schematic structure of a light mixing element illustrated in FIG. 1;

FIG. 6 is a block diagram illustrating control system of a synchronizing device illustrated in FIG. 1;

FIG. 7 is a flow chart for explaining control operation after stating the synchronizing device illustrated in FIG. 6;

FIG. 8 is a view for explaining the function of the light mixing element illustrated in FIG. 1 and FIG. 5;

FIG. 9 is a flow chart for explaining the control operation after stating the synchronizing device illustrated in FIG. 6;

FIG. 10 is a view for explaining a state after changing picture quality of the first color wheel illustrated in FIG. 2;

FIG. 11 is a view for explaining a state after changing picture quality of the first color wheel illustrated in FIG. 2; and FIG. 12 is a view in which the color transmission characteristics of the two color wheels in FIG. 10 and FIG. 11 are superposed.

In FIG. 1, "1" is an optical projection apparatus. The optical projection apparatus related to Embodiment 1 of the present invention comprises: a lamp device 2 emitting a white light ray L2 focused on a focal point P; a first color wheel 31 configured in a disk form that changes focused the light ray L2 into a colored light ray L3 in time division; a second color wheel 32 configured in a disk form that further changes the focused light ray L3 to a colored light ray L4 in time division; a driving means 41 for rotating the first color wheel 31 clockwise with its rotation center on the center of the first color wheel; a driving means 42 for rotating the second color wheel 32 clockwise, as with the first color wheel 31, with its rotation center on the center of the second color wheel; a light mixing element 5 for inputting the colored light ray L4 that is transmitted through the second color wheel 32 and focused on the focal point P, and emitting from an output facet light ray as a beam L5, whose illumination distribution on the cross section is unified; an optical system 6 for inputting the beam L5 from the light mixing element 5 and refracting the beam totally; a reflection display device 7 for modulating or switching a light ray L6 from the optical system 6 in accordance with inputted-image signals; and a projection lens 8 for magnifying to project onto a screen (not illustrated in FIG. 1) an image light ray L7, which is foamed on the reflection display device 7.

The lamp device 2 comprises: a lamp source 2a for emitting a light ray L1; a lamp reflector 2b for reflecting the light ray L1 on a light reflecting facet, which is spheroid-shaped with the rotation center on the axis AX and emits the focused light ray L2. A high-pressure mercury vapor lamp is used as the lamp source 2a in this Embodiment 1.

The first color wheel 31 consists of, as illustrated in FIG. 2, a red filter segment 31a, a green filter segment 31b, a blue filter segment 31c, and a white filter segment 31d, which are arranged in a circumferential direction (a rotating direction) and have sector-like shapes and different color transmission characteristics from each other. The color wheel 31 in this Embodiment 1 is divided in such a way that the white filter segment 31d has 180 degrees out of the center angle of 360 degrees of the color wheel 31, and the red filter segment 31a, the green filter segment 31b and the blue filter segment 31c each have 60 degrees out of remaining 180 degrees. Moreover, as with the first color wheel 31, as illustrated in FIG. 3, the second color wheel 32 consists of a red filter segment 32a, a green filter segment 32b, a blue filter segment 32c, and a white filter segment 32d, which are arranged in a circumferential direction (a rotating direction) and have sector-like shapes and different color transmission characteristics from each other. Moreover, the areal distributions for each filter segment are the same as those of the color wheel 31. As described above, in this Embodiment 1, the area of the white filter segment 31d on the first color wheel 31 is proportionally related, regardless of the wheel diameter, to the areas which consist of the red filter segment 32a, the green filter segment 32b, and the blue filter segment 32c on the second color wheel 32. The first color wheel 31 and the second color wheel 32 are arranged in such a way that the line connecting each of the centers is parallel to the light axis AX, and each of the wheel facets is perpendicular to the light axis AX. Moreover, "31e" in FIG. 2 is a spot on which the focused light ray L2 emitted from the lamp device 2 is incident, and "32e" in FIG. 3 is a spot on which the colored light ray L3 transmitted through the first color wheel 31 is incident. "31f" in FIG. 2 is a locus with the spot 31e, on which the focused light ray L2 from the lamp device 2 is incident, being moved around when the first color wheel 31 is rotated clockwise, and "32f" in FIG. 3 is a locus with the spot 32e, on which the colored light ray L3 is incident, being moved around when the second color wheel 32 is rotated clockwise. Moreover, on the first color wheel 31 and the second color wheel 32, a reference line 31g and a reference line 32g are drawn at the boundary between the white filter segment and the red filter segment, respectively. At the starting state of the optical projection apparatus 1, the reference line 31g and the reference line 32g are assumed to be in the same position (hereinafter, referred to as a reference position).

In Embodiment 1, motors are used for the driving means 41 and the driving means 42.

The light mixing element 5 is an optical element in the form of quadrangular prism, as illustrated in FIG. 1 and FIG. 5, in which an inputting facet 5a and an outputting-facet 5b each are an opening portion, and the inside of a side wall 5c connecting the inputting facet 5a and the outputting facet 5b has a reflective surface. Moreover, the focal point P of the focused light ray "L2" is assumed to be on the inputting facet 5a of the light mixing element 5.

As the reflection display device 7 in Embodiment 1, a DMD, which is a light modulating device having, for example, multiple micro-mechanical array elements, can be used. The reflection display device 7 and the outputting facet 5b of the light mixing element 5 are assumed to have optical conjugate relationships.

Moreover, each of the components described above in Embodiment 1 of the invention are all configured by using widely known parts and components.

In FIG. 1, "9" is the projection-type image displaying apparatus that comprises: the optical projection apparatus 1; the image signal inputting unit 10 for inputting image signals inputted from outside; the synchronizing device 11 for controlling the first color wheel 31 and the second color wheel 32 to synchronously rotate in predefined phase; the reflection drive control unit 12 for controlling the driving of the reflection display device 7 in synchronizing with the control of the synchronizing device 11; the memory 13 for storing image signals sent from the image signal inputting unit 10 and transmitting to the reflection display device 7 the stored image signals in accordance with drive instructions from the reflection drive control unit 12; and the picture-quality-change-signal inputting unit 14 to transmit input signals to the synchronizing device 11 for changing the quality of images displayed on the screen.

As illustrated in FIG. 6, the synchronizing device 11 further comprises: a frame rate detecting unit 111 for detecting a frame rate to count the number of still images that are comprised of inputted image signals per second; a motor control unit 112 for controlling the rotational velocities and phases of the motor 41 and motor 42 as their driving means based on frame signals from the frame rate detecting unit 111; a phase instruction unit 113 for transmitting to the motor control unit 112 phase instructions, so that phases of the first color wheel 31 and the second color wheel 32 are varied based on input signals from the picture-quality-change-signal inputting unit 14; and a synchronization detecting unit 114 for detecting synchronous rotation of the first color wheel 31 and the second color wheel 32. The synchronization detecting unit 114 comprises a first photo sensor 114a provided for transmitting a reference signal when the reference line 31g of the first color wheel 31 is detected at a predetermined check point, and similarly a second photo sensor 114b provided for transmitting a reference signal when the reference line 32g of the second color wheel 32 is detected at a predetermined check point. Hereinafter, explanations will be made on the assumption that input image signals are typical NTSC signals having 60 hertz frame rate, in other words, the number of still images per second is 60 frames.

Next, operations in Embodiment 1 are explained.

The power source (not illustrated) of the projection-type image displaying apparatus 9, is turned on and the lump source 2a starts illumination. If image signals are inputted into the image signal inputting unit 10 from outside, as illustrated in FIG. 1, FIG. 6, and FIG. 7, the image signal inputting unit 10 outputs the image signals to the frame rate detecting unit 111 and the memory 13 of the synchronizing device 11 (ST1). The frame rate detecting unit 111 detects the frame rate of the image signals (ST2). If the frame rate is detected to be 60 Hertz by the frame rate detecting unit 111, the motor control unit 112 calculates the rotational velocities of the driving means 41 and the driving means 42 so as to synchronously rotate the first color wheel 31 and second color wheel 32 at 60 revolutions per second based on the detected frame rate, and then transmits the control signals to the driving means 41 and the driving means 42

(ST3). The driving means 41 and the driving means 42 start rotational driving based on the control signals from the motor control unit 112. Thereby, the first color wheel 31 and second color wheel 32 increase their rotating velocities until they rotates synchronously with the inputted frame rate. The photo sensor 114a and the photo sensor 114b generate reference signals every time the reference line 31g and the reference line 32g pass over predetermined check points, due to the rotational operations of the first color wheel 31 and second color wheel 32 (ST4). The synchronization detecting unit 114 detects transmission timing for the reference signals from the photo sensor 114a and the photo sensor 114b, and judges whether the wheels are rotating at a predetermined velocity (ST5). If the transmission timing for the reference signals from the photo sensor 114a and the photo sensor 114b is not the predetermined timing corresponding to the rotational velocity, the synchronization detecting unit 114 transmits to the motor control unit 112 an abnormal signal as a case in which the rotational velocity of the first color wheel 31 or second color wheel 32 is not correct (ST6). Thereby, the motor control unit 112 varies the rotational velocity of the driving means 41 or the driving means 42 according to the abnormal signal, and transmits control signals to the driving means 41 or the driving means 42 to satisfy the predetermined timing (ST3). Next, the detecting unit judges whether a predetermined timing difference condition is satisfied, the timing difference condition is, for example, such that the transmission timings of the reference signals from the photo sensor 114a and the photo sensor 114b are the same as those at the starting time in Embodiment 1 (ST7). If the transmission timings of the reference signals are not the same, the synchronization detecting unit 114 retransmits to the motor control unit 112 an abnormal signal, as a case in which the phases of the first color wheel 31 and second color wheel 32 are not in correct phase(ST6). The motor control unit 112 varies the rotational velocities of the driving means 41 or the driving means 42 based on the abnormal signal from the synchronization detecting unit 114, and transmits control signals to the driving means 41 or the driving means 42 so as to satisfy the predetermined timing condition (ST3). Thereby, if the transmission timings of reference signals are the same, normal detection signals are transmitted from the synchronization detecting unit 114, because it is judged that the first color wheel 31 and second color wheel 32 are in synchronous rotation with image signals and in correct phase. The detection signals from the synchronization detecting unit 114 are inputted into the reflection drive control unit 12 (ST8).

For example, if the white focused light ray L2 from the lamp source 2 is incident on the spot 31e on the blue filter segment 31c on the color wheel 31 in FIG. 2, the blue light ray L3 is transmitted through the wheel color 31. Though, the transmitted blue light ray L3 is transmitted to the color wheel 32, the spot 32e on which the blue light ray L3 is incident, is on the filter segment 32c of the same blue color on the color wheel 32, because the color wheel are in synchronous rotation at the reference position in the starting state. Therefore, the light ray L4 transmitted through the color wheel 32 remains blue. In the same way, if the spot 31e is on the red light lay filter segment 31a on the color wheel 31, the light ray L4 transmitted through the color wheel 32 remains red, because the spot 32e on which the red light lay L3 is incident, on the color wheel 32, is on the red light lay filter segment 32a on the color wheel 32. In the same way as described above, if the spot 31 is on the green light lay filter segment 3b or the white light lay filter segment 31d, the light ray L4 transmitted through the color wheel 32 remains green or white. As described above, the light ray L3, which is transmitted through any of the color filter segments on the color wheel 31, is incident on the filter segment with the same color, on the color wheel 32, and the same color light ray L4 is focused on the focal point P.

Consequently, the light ray L4, which is inputted from the input facet 5a of the light mixing element 5 and focused on the focal point P, is changed to the beam L5 whose cross sectional illumination distribution is uniform on the output facet 5b, another facet thereof, because reflections of the light rays L4 are repeated on the side wall 5c, and the light rays reflected with various angles are mixed in the light mixing element 5. Thereby, the color of the light ray L6, which is incident on the reflection display device 7 through the optical system 6 for focusing light rays, is the same color of the light ray L3 transmitted through the color wheel 31.

As illustrated in FIG. 4, if the color transmission characteristics of the color wheel 31 and the color wheel 32 are superposed, the arrangement of the filter segments in which the filter segments of the color wheel 31 and the color wheel 32 are composed, is equal to the arrangements of each of filter segments on the color wheel 31 and the color wheel 32.

The reflection drive control unit 12 is synchronized with the filter segments, which are illuminated at the reference position, on the color wheel 31 and the color wheel 32, and so as to distinguish the color frame of the light ray L6 that is incident on the reflection display device 7, based on the normal detection signals from the synchronization detecting unit 114. At this time, the reflection drive control unit 12 starts the sequence to pick out sequential frames of image data from the memory 13 and write into the reflection display device 7. The reflection drive control unit 12 accordingly reads from the memory 13 red, green, or blue color data corresponding to the color of the light rays that are incident on the reflection display device 7. Thereby, the projection-type image displaying apparatus is configured in which, by transmitting color data from the memory 13 to the reflection display device 7, the rotation of the color wheels and the obtaining of images by the reflection display device 7 are synchronously performed based on the control from the synchronizing device 11. That is, the apparatus is configured in such a way that one field period of the displaying device 7 and a period in which each of the color filter segments on the color wheels is sequentially placed at the light path, are controlled to be identical. As described above, the image frames, which are corresponding to the colors of each of the light rays that are split in time-divisionally, are quickly displayed by modulating the incident light ray L6 into the light ray L7 reflected to the projection lens 8 according to R, G, B, or W colors after each of the color filter segments being sequentially placed at the light path, deeming one field as one period. The modulated each color light ray L7 is magnified and projected through the projection lens 8 onto the screen. In the image projected onto the screen, because each of R, G, B, and W color images are sequentially displayed in one-sixtieth second, the images are recognized as a spectrum in human eyes, and in turn, recognized as full color images. As described above, because a white color is added to three primary colors, brightness-enhanced images can be displayed on the screen.

Next, in this state, an operator changes the picture quality on the screen by the picture-quality-change-signal inputting unit 14, and then the picture-quality-change-signal inputting unit 14 transmits input signals to the phase instruction unit 113 of the synchronizing device 11 (ST1). The phase instruction unit 113 transmits to the motor control unit 112 phase instructions based on the phase from the reference position that is predetermined based on the distribution of each filter segment on the color wheel 31 and the color wheel 32 (ST2). The phase difference in Embodiment 1 is to be 180 degrees. The motor control unit 112 controls the rotational velocities of the motor 41 and 42, based on the reference instructions, in such a way that the phase difference from the reference position becomes 180 degrees (ST3). The synchronization detecting unit 114, based on the transmission timing of the reference signals from the photo sensors 114a and 114b (ST4), detects whether the phase difference is 180 degrees (ST5). A method of detecting the phase matching, for example, has been proposed in that a transmission timing of the reference signal, when the phase difference is 180 degrees, is detected at one $120^{th}$ of a second after the last signal is transmitted, because necessary time for one rotation is one $60^{th}$ of a second when the color wheel 31 and 32 are rotated at 60 revolutions per second. Here, if the transmission timing difference between the reference signals from the photo sensors 114a and 114b is not at an interval of one $120^{th}$ of a second, the synchronization detecting unit 114 transmits to the motor control unit 112 an abnormal signal for reporting the unit of phase mismatching (ST6). The motor control unit 112 varies the rotational velocities of the driving means 41 or the driving means 42 based on the abnormal signal from the synchronization detecting unit 114, and then retransmits to the driving means 41 or the driving means 42 control signals so as to satisfy the above described timing difference condition (ST3). Thereby, if the timing difference condition is satisfied (ST5), because it is judged that the first color wheel 31 and second color wheel 32 synchronously rotate with the image signals and also the phase difference with respect to the reference position is 180 degrees, the synchronization detecting unit 114 transmits normal detection signals (ST7). These detection signals from the synchronization detecting unit 114 are inputted into the reflection drive control unit 12.

At this time, the color wheel 31 and color wheel 32 synchronously rotate in a state in which the phase difference between the reference line 31g and the reference line 32g is maintained in 180 degrees. If the elevation view for the color wheel 31 is as illustrated in FIG. 10, the elevation view for the color wheel 32 becomes in a phase state as illustrated in FIG. 11. Here, for example, if the focused light ray L2 from the lamp source 2 is incident on the spot 31e on the blue filter segment 31c on the color wheel 31, though the blue light ray L3 is transmitted from the color wheel 31 to the color wheel 32, the spot 32e on the color wheel 32, on which the blue light ray L3 is incident, is on the white filter segment 32d, which differs from blue, because the reference line 31g and the reference line 32g are in a phase relationship of 180 degrees. Therefore, the blue light ray L4 transmits intact through the white filter segment 32d. In the same way, if the spot 31e is on the red filter segment 31a on the color wheel 31, the light ray L4 transmitted through the color wheel 32 remains red, because the spot 32e on which the red light ray L3, which is transmitted to the color wheel 32, is illuminated, is on the white filter segment 32d on the color wheel 32. In the same way as described above, if the spot 31e is on the green filter segment 31b, the light ray L4 transmitted through the color wheel 32 remains green.

Meanwhile though the white ray L3 is incident on the color wheel 32 when the spot 31e is on the white filter segment 31d, the light ray L4 transmitted through the color wheel 32 is not a white light ray, but is changed into a red, green, or blue light ray, because the spot 31e, on which the white light ray L3 is incident, is on the red filter segment 31a, the green filter segment 31b, or the blue filter segment 31c on the color wheel 32. Thereby, the color of the light ray L6 that is formed by the light mixing element into a beam whose cross sectional illumination distribution is uniform, and is incident on the reflection display device 7 through the focusing optical system 6 remains the same color when the color of the light ray L3 transmitted through the color wheel 31 is R, G, or B color, and when the color of the light ray L3 transmitted through the color wheel 31 is W color, the color of the light ray L6 is changed to R, G, or B color in accordance with distributions of the filter segments 32a, 32b, and 32c on the color wheel 32.

The reflection drive control unit 12 recognizes a color frame of the light ray L6 which is incident on the reflection display device 7, based on the normal detection signals from the synchronization detecting unit 114, while maintaining synchronization with the illuminated filter segments on the color wheel 31 and the color wheel 32 at phase of 180 degrees.

In Embodiment 1, if the color transmission characteristics of the color wheel 31 and the color wheel 32 are superposed when those phases are different in 180 degrees, the combined characteristics are equal to the color transmission characteristics of the color wheel half of that consists of the red filter segment 31a, the green filter segment 31b, and the blue filter segment 31c on the color wheel 31, and remaining half of which consists of the red filter segment 32a, the green filter segment 32b, and the blue filter segment 32c on the color wheel 32 as illustrated in FIG. 12, because the area of the white filter segment 31d on the first color wheel 31 is proportionally related to the areas that consist of the red filter segment 32a, the green filter segment 32b, and the blue filter segment 32c on the color wheel 32.

As described above, the images of each of R, G, B, R, G, and B colors are sequentially displayed in one $60^{th}$ of a second on the images displayed on the screen, because the color wheel illustrated in FIG. 12 has color transmission characteristics in which each of color filter segments is sequentially placed in the light path in a period of one field. In this case, because the white light ray L6 is not incident on the reflection display device 7, images in which color repeatability is enhanced, can be displayed.

In the projection-type image displaying apparatus configured as described above, because the apparatus has the first color wheel 31, the second color wheel 32 and the synchronizing device 11 for controlling the first color wheel and the second color wheel to synchronously rotate, and configured in such a way that the W area can be increased or decreased in the color transmission characteristics of the composed color wheel by varying phases of the two color wheels to come to a predetermined value by the synchronizing device 11 based on inputted signals from the picture-quality-change-signal inputting unit, the time-divisional distribution patterns for colored light rays that are incident on the reflection display device can be made variable; and consequently, images displayed on the screen can be changed reversibly between color brightness enhanced and color repeatability enhanced mode.

In the above explanation, though a configuration is explained, in which an operator transmits to the picture-quality-change-signal inputting unit 14 by manual operation, the apparatus may be configured allowing automatic change of picture quality depending on output source of image signals inputted from outside. For example, if the output source of image signals is a personal computer, the apparatus may be configured in which the picture-quality-change-signal inputting unit 14 selects brightness-enhanced picture quality and the unit automatically transmits to the synchronizing device 11 input signals for synchronously rotating the two color wheels in a state of reference position. Meanwhile, if the output source of video signal is a VTR, the apparatus may be configured in which the picture-quality-change-signal inputting unit 14 selects color-repeatability-enhanced picture quality, and the unit automatically transmits to the synchronizing device 11 input signals for synchronously rotating the two color wheels in a state in which the phases of two color wheels are changed. In other cases, the apparatus may be configured in which the picture-quality-change-signal inputting unit 14 has a sensor for detecting brightness of outside, and the picture-quality-change-signal inputting unit 14 automatically judges which is enhanced brightness or color repeatability according to signals from the sensor. Thereby, it is not necessary that an operator recognizes easy-to-view picture quality in each case, and screen display, which is suitable for surrounding conditions, etc., can be obtained.

Moreover, in this Embodiment, though the apparatus is explained by using the color wheels in which the three primary color filter segments are placed clockwise in a sequential order of R, G, and B color, it is obvious that the sequential order can be changed, because the sequential order is changed without affecting achievement of aims of the invention.

In the above Embodiment 1, though the configuration is explained on a case in which each of the three primary color filter segments has an angle of 60 degrees, as far as the total angle of the three primary color filter segments is 180 degrees, and each of the three primary color filter segments on the first color wheel has proportional relationships to each corresponding color filter segment with the same color, on the second color wheel, the angle is not limited to 60 degrees because the same effect can be obtained.

Moreover, though the apparatus is explained on a case in which a high-pressure mercury vapor lamp is used as the lamp source 2a, a lamp may be used as far as the lamp emits a white light ray; the same effect can be obtained even if a light source such as a white LED, a xenon arc lamp, or a metal halide lamp, is used.

Moreover, though an apparatus, in which the color wheels are rotated at one revolution in a sixtieth of a second based on the frame rate, is explained in this Embodiment, the apparatus may be configured in which the velocities of the color wheels are doubled and rotated at 120 revolutions per second. Thereby, if the splitting count of R, G, and B light rays, which are split in time division, is increased double, the color display can be made better owing to a spectrum effect of human eyes, because split intervals per color become shorter.

Embodiment 2

Figure 13:
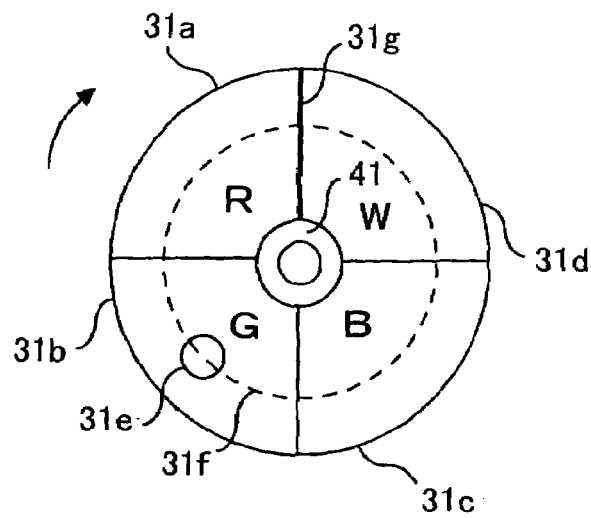
FIG. 13 is an elevation view illustrating the starting state of the first color wheel illustrated in FIG. 1, according to Embodiment 2 of the invention.
Figure 14:
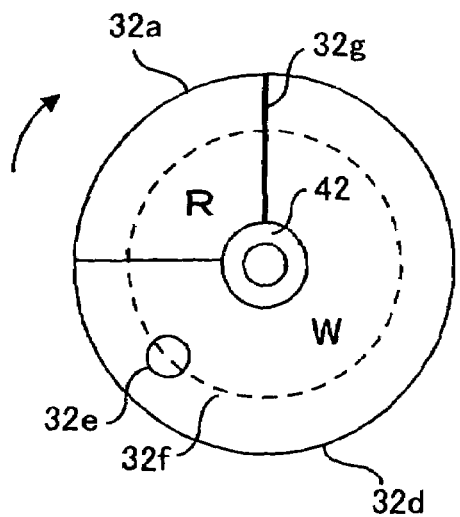
FIG. 14 is an elevation view illustrating the starting state of the second color wheel illustrated in FIG. 1, according to Embodiment 2 of the invention.
Figure 15:
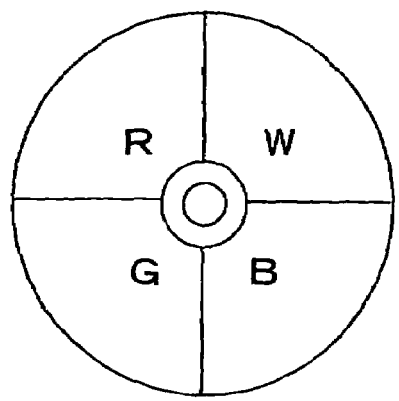
FIG. 15 is a view in which the color transmission characteristics of the two color wheels in FIG. 13 and FIG. 14 are superposed.
Figure 16:
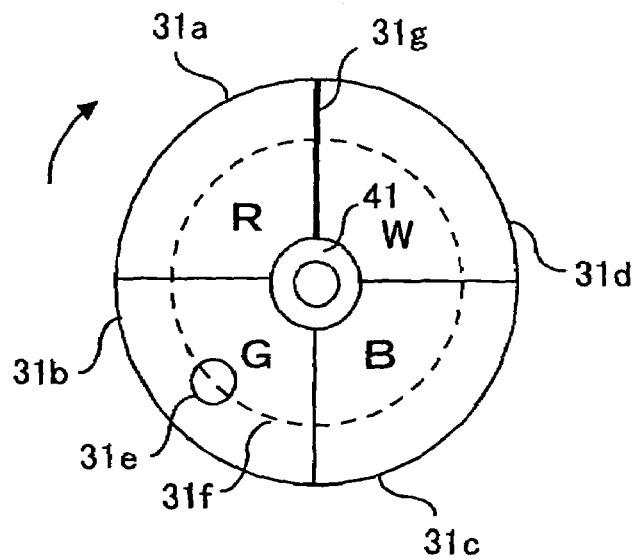
FIG. 16 is a view illustrating a state of the first color wheel illustrated in FIG. 13 after the picture quality has been changed.
Figure 17:
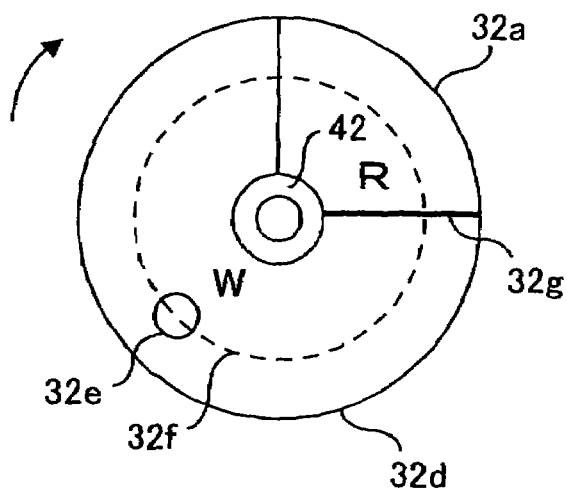
FIG. 17 is an elevation view illustrating a state of the second color wheel illustrated in FIG. 14 after the picture quality has been changed.
Figure 18:
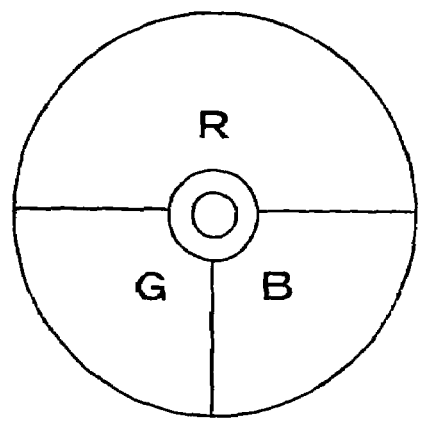
FIG. 18 is a view in which the color transmission characteristics of the two color wheels in FIG. 16 and FIG. 17 are superposed.
Figure 19:
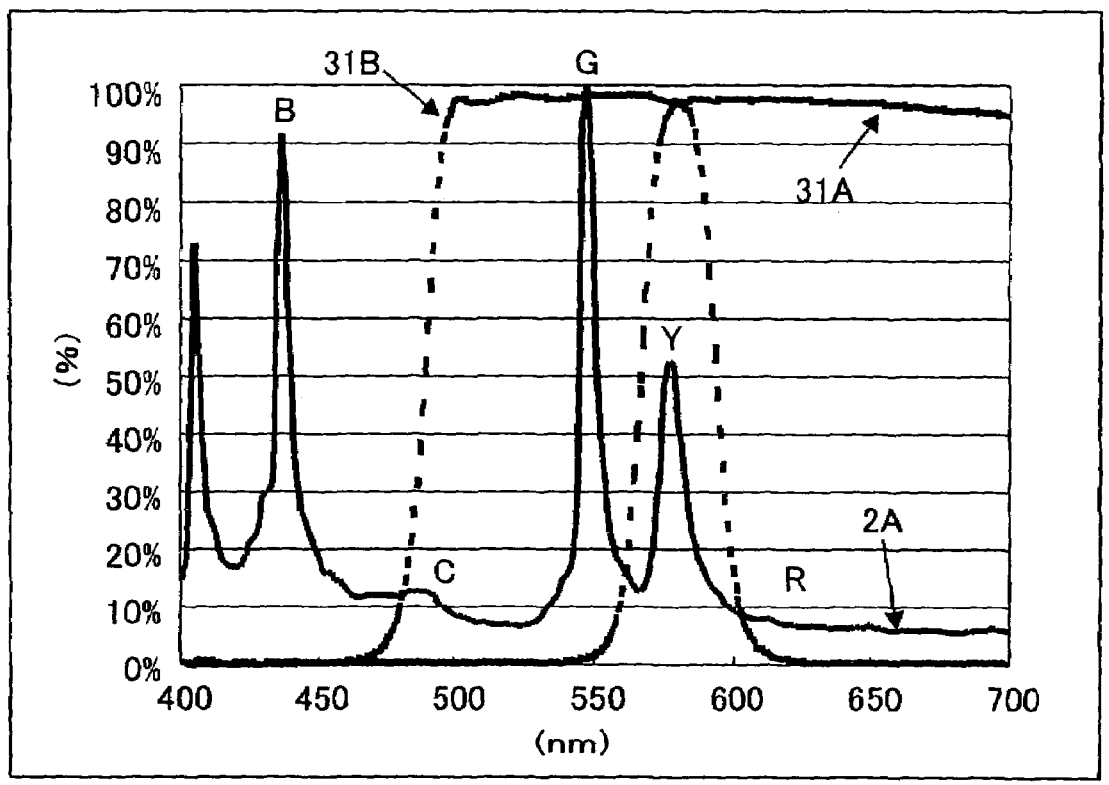
FIG. 19 is a graph illustrating light emitting characteristics of a high-pressure mercury vapor lamp and color transmission characteristics of a red filter segment and a green filter segment.

FIG. 13 is an elevation view illustrating the starting state of the first color wheel illustrated in FIG. 1, according to Embodiment 2 of the invention;

FIG. 14 is an elevation view illustrating the starting state of the second color wheel illustrated in FIG. 1, according to Embodiment 2 of the invention;

FIG. 15 is a view in which the color transmission characteristics of the two color wheels in FIG. 13 and FIG. 14 are superposed;

FIG. 16 is a view illustrating a state of the first color wheel illustrated in FIG. 13 after the picture quality has been changed;

FIG. 17 is an elevation view illustrating a state of the second color wheel illustrated in FIG. 14 after the picture quality has been changed;

FIG. 18 is a view in which the color transmission characteristics of the two color wheels in FIG. 16 and FIG. 17 are superposed; and FIG. 19 is a graph illustrating light emitting characteristics of a high-pressure mercury vapor lamp and color transmission characteristics of a red filter segment and a green filter segment.

In FIG. 13, though the first color wheel 31 in this Embodiment 2 consists of, as described in Embodiment 1, a red filter segment 31a, a green filter segment 31b, a blue filter segment 31c, and a white filter segment 31d, which are arranged in a circumferential direction and have sector-like shapes and different color transmission characteristics from each other, the distributions of each of the filter segments are different from those in Embodiment 1. In Embodiment 2, the central angle distributions of each of the filter segments are 90 degrees. Moreover, the second color wheel 32 in Embodiment 2 is different from the first color wheel 31 and consists of a red filter segment 32a and a white filter segment 32d as illustrated in FIG. 14, the distribution of the central angle for the red filter segment 32a is 90 degrees, which is the same as the white filter segment 31d on the first color wheel 31, and the distribution of the central angle of the white filter segment 32d is residual 270 degrees. The configuration of the apparatus, except the first color wheel 31 and the second color wheel 32, is the same as those in Embodiment 1. As described above, in this Embodiment 2, the area of the white filter segment 31d on the first color wheel 31 is proportionally related, regardless of the wheel diameter, to the area of red filter segment 32a on the second color wheel 32.

Next, operations in Embodiment 2, which are different from those in Embodiment 1, are explained.

When the illumination of the lump source 2a is started by turning on a power source (not illustrated) of the projection-type image displaying apparatus 9, and the image signals are outputted from the image signal inputting unit 10 (ST1), the synchronizing device 11 executes the same process as Embodiment 1 and judges whether the transmission timing of the reference signal is matched with a predefined rotational velocity (ST5). Then, when it is judged that the transmission timing of the reference signal from the photo sensor 114a is the same as the transmission timing of the reference signal from the photo sensor 114b at the reference position (ST7), the normal detection signals are outputted from the synchronization detecting unit 114 to the reflection drive control unit 12 (ST8).

Here, for example, if the focused light ray L2 from the lamp source 2 is incident on the spot 31e on the green filter segment 31b of the color wheel 31 in FIG. 13, the green light ray L3 is transmitted through the color wheel 31. The transmitted green light ray L3 is incident on the wheel color 32; because the color wheels synchronously rotate at the reference position, the spot 32e on which the green light ray L3 is incident, is on the white filter segment 32d as illustrated in FIG. 14. Therefore, the light ray L4 transmitted through the color wheel 32 remains green. In the same way, if the spot 31e is on the blue filter segment 31c on the color wheel 31, the light ray L4 transmitted through the color wheel 32 remains blue, because the spot 32e on which the blue light lay L3 sent to the color wheel 32 is incident, is on the white filter segment 32d on the color wheel 32. Moreover, if the spot 31e is on the white filter segment 31d on the color wheel 31, the light ray L4 transmitted through the color wheel 32 remains white, because the spot 32e on which the white light lay L3 sent to the color wheel 32 is incident, is on the white filter segment 32d on the color wheel 32.

On the other hand, if the spot 31e is on the red filter segment 31a on the color wheel 31, the light ray L4 transmitted through the color wheel 32 remains red, because the spot 32e on which the red light lay L3 sent to the color wheel 32 is incident, is on the red light segment 32a.

As illustrated in FIG. 15, if the color transmission characteristics of the color wheel 31 and the color wheel 32 are superposed, the arrangement of the filter segments in which the filter segments of the color wheel 31 and the color wheel 32 are composed, is equal to the arrangements of the filter segments on the color wheel 31 in Embodiment 2.

When the reflection drive control unit 12, as described in Embodiment 1, is synchronized, at the reference position, with the filter segments that are illuminated on the color wheel 31 and the color wheel 32 so as to process to distinguish the color frames of the light rays that are incident on the reflection display device 7, based on the normal detection signals from the synchronization detecting unit 114, each of R, G, B, and W color images is sequentially displayed with a equal period during one $60^{th}$ of a second for an image projected onto the screen.

Next, if the picture quality on the screen is changed by the picture-quality-change-signal inputting unit 14, and the picture-quality-change-signal inputting unit 14 transmits input signals to the phase instruction unit 113 of the synchronizing device 11 as illustrated in FIG. 9 (ST1), the phase instruction unit 113 transmits to the motor control unit 112 a phase instruction for setting the phase difference between the color wheels to 90 degrees in this Embodiment 2 (ST2). The motor control unit 112 controls the rotational velocities of the motors 41 and 42, based on the reference instruction, in such a way that the phase difference from the reference position becomes 90 degrees (ST3). The synchronization detecting unit 114, based on the transmission timing difference of the reference signals from the photo sensors 114a and 114b (ST4), detects whether the phase difference between the color wheels is 90 degrees (ST5). The phase matching is recognized, using the same method as in Embodiment 1, by detecting that the reference signal from the photo sensor 114b, when the phase difference is 90 degrees, is transmitted one $80^{th}$ of a second after the reference signal from the photo sensor 114a has been transmitted. If the transmission timing difference between the reference signals from the photo sensors 114a and 114b is not at an interval of one $80^{th}$ of a second, the synchronization detecting unit 114 transmits to the motor control unit 112 an abnormal signal for reporting the unit of phase mismatching (ST6). The motor control unit 112 varies the rotational velocity of the driving means 42 or the driving means 41 based on the abnormal signal from the synchronization detecting unit 114, and then retransmits to the driving means 42 or the driving means 41 control signals so as to satisfy the above described timing condition (ST3). Thereby, if the timing condition is satisfied (ST5), because it is judged that the first color wheel 31 and second color wheel 32 synchronously rotate with the image signals and also the phase difference with respect to the reference position is 90 degrees, the synchronization detecting unit 114 transmits normal detection signals (ST7). These detection signals from the synchronization detecting unit 114 are input into the reflection drive control unit 12.

At this time, the color wheel 31 and color wheel 32 synchronously rotate in a state in which the phase difference between the reference line 31g and the reference line 32g is maintained 90 degrees. If the elevation view for the color wheel 31 is as illustrated FIG. 16, the elevation view for the color wheel 32 becomes in a phase state as illustrated in FIG. 17.

Here, if the focused light ray L2 from the lamp source 2 is, for example, incident on the spot 31e on the green filter segment 31b on the color wheel 31, the spot 32e on the color wheel 32, on which the green light ray L3 is incident, is on the white filter segment 32d in FIG. 17, and the green light ray L4 is transmitted intact, because the phase difference between the reference line 31g and the reference line 32g is 90 degrees. In the same way, if the spot 31e is on the blue filter segment 31c, because the spot 32e is on the white filter segment 32d, the blue light ray L4 is transmitted intact.

Meanwhile, if the spot 31e is on the white filter segment 31d, the light ray L4 transmitted through the color wheel 32 is changed into red, because the spot 32e, on which the white light ray L3 is incident, is on the red filter segment 32a on the color wheel 32. Moreover, if the spot 31e is on the red filter segment 31a, because the spot 32e is on the white filter segment 32d, the red light ray L4 is transmitted intact.

In Embodiment 2, if the color transmission characteristics of the color wheel 31 and the color wheel 32 are superposed when those phases are different in 90 degrees, the combined characteristics are equal to the color transmission characteristics of the color wheel that consists of the red filter segment 31a, the green filter segment 31b, and the blue filter segment 31c on the color wheel 31, and remaining of which consists of the red filter segment 32a on the color wheel 32 as illustrated in FIG. 18, because the area of the white filter segment 31d on the first color wheel 31 is proportionally related, regardless of the wheel diameter, to the area of the red filter segment 32a on the color wheel 32.

As described above, in Embodiment 2, the images of each of R, G, B, and B colors are sequentially displayed at equal intervals in one $60^{th}$ of a second on the images displayed on the screen, because the color wheel illustrated in FIG. 18 has color transmission characteristics in which each of color filter segments is sequentially placed in the light path in a period of one field. Therefore, the white light ray is not incident on the reflection display device 7 after the picture quality has been changed.

In the projection-type image displaying apparatus configured as described above, because the first color wheel 31 has four color filter segments (red, green, blue, and white), and the second color wheel 32 has a white filter segment and any one of three primary color filter segments, which is the red filter segment 32a in this Embodiment 2, and configured in such a way that the W area can be increased or decreased in the color transmission characteristics of the composed color wheel by varying phases of the first color wheel 31 and the second color wheel 32 to come to a predetermined value by the synchronizing device 11, the time-divisional distribution patterns for colored light rays that are incident on the reflection display device can be made variable; and consequently, images displayed on the screen can be changed reversibly between color brightness enhanced and color repeatability enhanced mode; and additionally, the illumination times of the red light in three primary colors can be more increasing than the illumination times of another primary colors. Here, the general light emitting characteristics of high-pressure mercury vapor lamps used as the lamp source 2a is described as a curve 2A illustrated in FIG. 19. According to this curve, in the light emitting characteristics of high-pressure mercury vapor lamps, it is proved that the brightness of the red light ray having near 610 nm wavelength is lower than the brightness of the green light ray having near 550 nm wavelength or the blue light ray having near 410 nm wavelength. Therefore, the brightness of the red light ray can be compensated by increasing the illumination duration of the red light lay longer than the illumination durations of other primary colors, and the color repeatability of the images projected onto the screen can be further improved when a high-pressure mercury vapor lamp is used as the lamp source 2a.

In the above explanation, though the phase of the second color wheel 32 is shifted by 90 degrees in this Embodiment, in cases where the phase is set at any angle lower than 90 degrees, and the spot 32e on which the white light ray L3 is incident, is on the white filter segment 32d, when the spot 31e is also on the white filter segment 31d, the white color images displayed on the screen can be adjusted in inverse proportion to the phase angle, because the color transmission characteristics of the color wheels, after the phase has been varied, include a white area. Therefore, the projection-type image displaying apparatus can be obtained, in which the color repeatability can be slightly enhanced while enhancing the color brightness, or contrary, the color brightness can be slightly enhanced while enhancing the color repeatability, in accordance with surrounding conditions, etc.

In the above Embodiment 2, though the configuration of the apparatus is explained on a case in which each of color filter segments on the first color wheel has an angle of 90 degrees, the angle is not limited to 90 degrees, because the same effect can be obtained, as far as the red filter segment 31a on the first color wheel is proportionally related to the red filter segment 32a and white filter segment 32d on the second color wheel.

Moreover, in this Embodiment, though the apparatus is explained by using the first color wheel 31 in which the red, green, blue, and white filter segments are arranged clockwise in this sequence, the sequence may be changed because the aim of this invention can be achieved by enhancing the color brightness of the red light ray, even if the sequence is changed, as far as the phase angle with respect to the second color wheel 32 is varied, so that the light ray L3, which is transmitted through the white filter segment 31d on the first color wheel 31 after the phase has been varied, is incident on the red filter segment 32a on the second color wheel 32.

Embodiment 3

Figure 20:
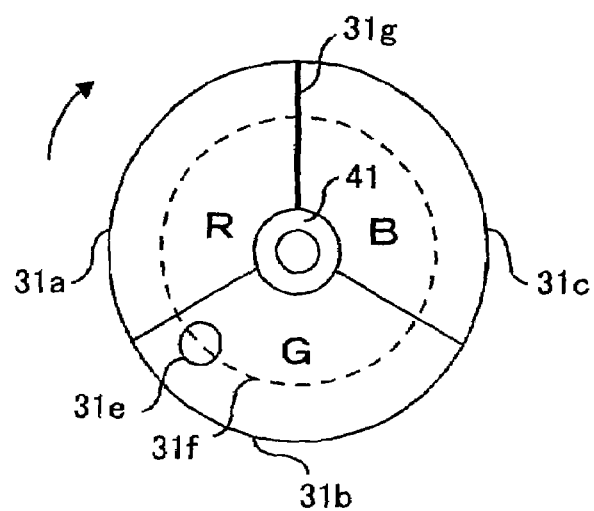
FIG. 20 is an elevation view illustrating the starting state of the first color wheel illustrated in FIG. 1, according to Embodiment 3 of the invention.
Figure 21:
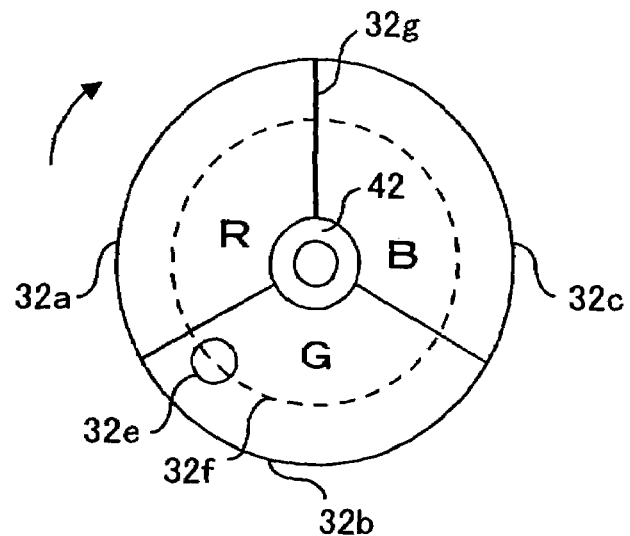
FIG. 21 is an elevation view illustrating the starting state of the second color wheel illustrated in FIG. 1, according to Embodiment 3 of the invention.
Figure 22:
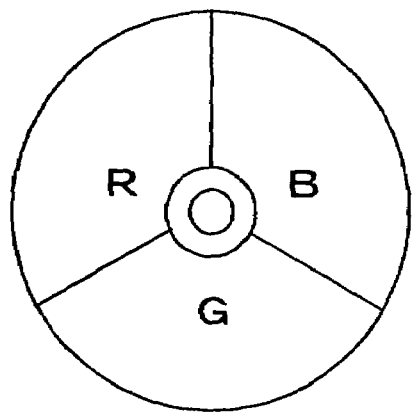
FIG. 22 is a view in which the color transmission characteristics of the two color wheels in FIG. 20 and FIG. 21 are superposed.
Figure 23:
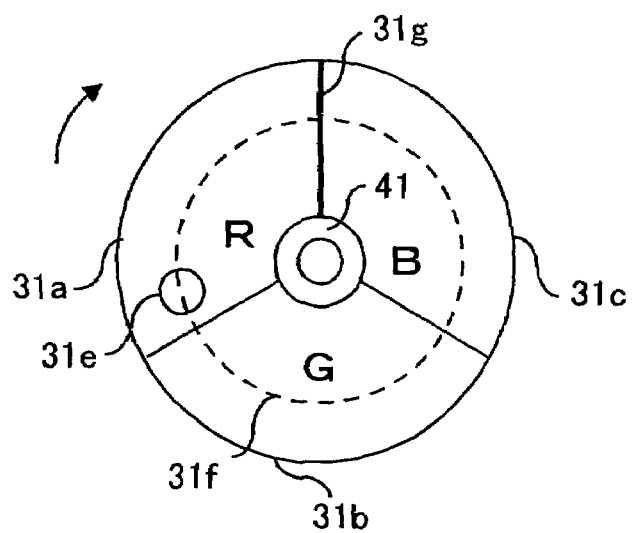
FIG. 23 is an elevation view illustrating a state of the first color wheel illustrated in FIG. 20 after the picture quality has been changed.
Figure 24:
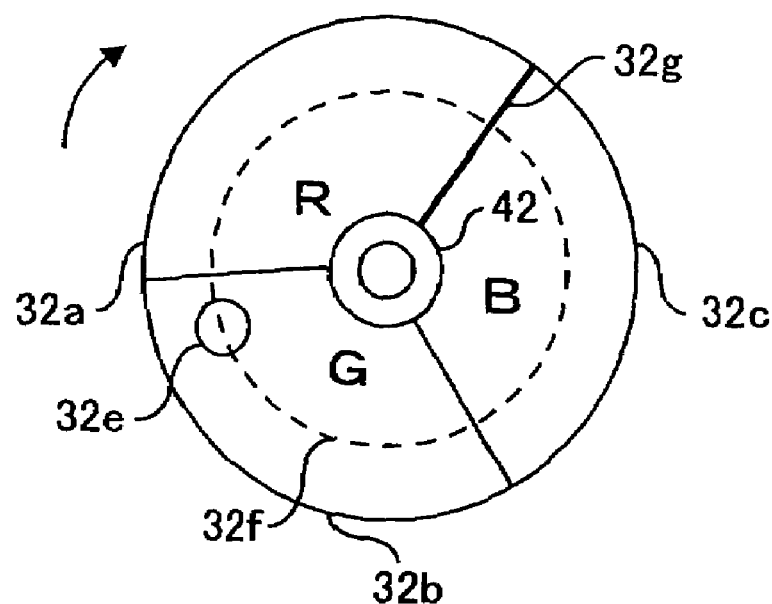
FIG. 24 is an elevation view illustrating a state of the second color wheel illustrated in FIG. 21 after the picture quality has been changed.
Figure 25:
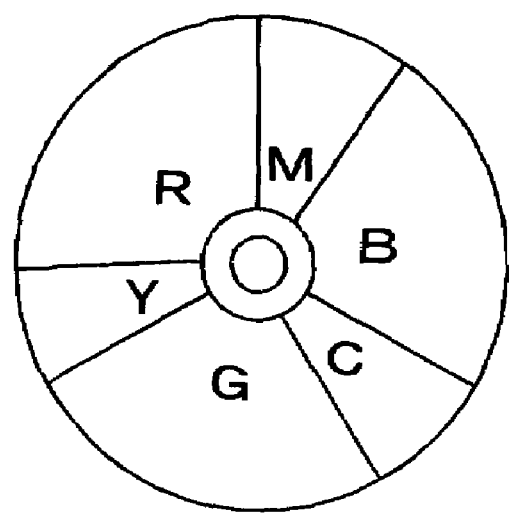
FIG. 25 is a view in which color transmission characteristics of the two color wheels in FIG. 23 and FIG. 24 are superposed.

FIG. 20 is an elevation view illustrating the starting state of the first color wheel illustrated in FIG. 1, according to Embodiment 3 of the invention;

FIG. 21 is an elevation view illustrating the starting state of the second color wheel illustrated in FIG. 1, according to Embodiment 3 of the invention;

FIG. 22 is a view in which the color transmission characteristics of the two color wheels in FIG. 20 and FIG. 21 are superposed;

FIG. 23 is an elevation view illustrating a state of the first color wheel illustrated in FIG. 20 after the picture quality has been changed;

FIG. 24 is an elevation view illustrating a state of the second color wheel illustrated in FIG. 21 after the picture quality has been changed; and FIG. 25 is a view in which color transmission characteristics of the two color wheels in FIG. 23 and FIG. 24 are superposed.

In FIG. 20, the first color wheel 31 in this Embodiment 3 consists of a red filter segment 31a, a green filter segment 31b, and a blue filter segment 31c, which are arranged in a circumferential direction and have sector-like shapes, and distributed central angles for each of the filter segments are 120 degrees. Moreover, as illustrated in FIG. 21, the second color wheel 32 in Embodiment 3 is the same as the first color wheel 31. The configuration of the apparatus, except the first color wheel 31 and the second color wheel 32, are the same as those in Embodiment 1. As described above, in this Embodiment 3, the areas of the filter segments on the first color wheel 31 are proportionally related, regardless of the wheel diameter, to the areas of filter segments with the same color on the second color wheel 32.

In Embodiment 3, after starting the apparatus, the operations of control system of the synchronizing device 11, before changing the picture quality, are the same as those in Embodiment 1.

Here, after stating the apparatus, if the focused light ray L2 from the lamp source 2 is incident on the spot 31e on the green filter segment 31b of the color wheel 31, for example, illustrated in FIG. 20, the spot 32e on which the green light ray L3 from the color wheel 31 is incident, is on the same-green filter segment 32b as illustrated in FIG. 21, because the wheels are synchronously rotated at the reference position, and configurations of filter segments on the color wheel 31 and the color wheel 32 each are the same. Therefore, the light ray L4 transmitted through the color wheel 32 remains green. Red and blue light lays are transmitted similarly.

As illustrated in FIG. 22, superposing of the color transmission characteristics at the reference position leads the color transmission characteristics to be equal to those of the color wheel 31 in FIG. 20 in Embodiment 3.

When reflection drive control unit 12 processes to distinguish, being synchronized with the color transmission characteristics of this color wheel, the color frames of the light ray 6 that is incident on the reflection display device 7, the image projected onto the screen displays each of R, G, B, and W color images that is sequentially displayed at equal intervals in one $60^{th}$ of a second.

Next, if the picture-quality-change-signal inputting unit 14 transmits input signals to the phase instruction unit 113 of the synchronizing device 11 (ST1) so as to change the picture quality on the screen, the phase instruction unit 113 transmits to the motor control unit 112 a phase instruction for setting the phase difference between the color wheels to 30 degrees in this Embodiment 3 (ST2). The motor control unit 112 controls the rotational velocities of the motors 41 and 42, based on the reference instruction, in such a way that the phase difference from the reference position becomes 30 degrees (ST3). The synchronization detecting unit 114, based on the transmission timing of the reference signals from the photo sensors 114a and 114b (ST4), detects whether the phase difference between the color wheels is 30 degrees (ST5). This phase matching is recognized, using the same method as in Embodiment 1, by detecting that the reference signal from the photo sensor 114b, when the phase difference is 30 degrees, is transmitted eleven $720^{ths}$ of a second after the reference signal from the photo sensor 114a has been transmitted. If the transmission timing difference between the reference signals from the photo sensor 114a and the photo sensor 114b is not at an interval eleven $720^{ths}$ of a second, the synchronization detecting unit 114 transmits to the motor control unit 112 an abnormal signal for reporting the unit of phase mismatching (ST6). The motor control unit 112 varies the rotational velocity of the driving means 42 or the driving means 41 based on the abnormal signal from the synchronization detecting unit 114, and then retransmits to the driving means 42 or the driving means 41 control signals so as to satisfy the above described timing condition (ST3). Thereby, if the timing condition is satisfied (ST5), because it is judged that the first color wheel 31 and second color wheel 32 synchronously rotate with the image signals and also the phase difference with respect to the reference position is 30 degrees, the synchronization detecting unit 114 transmits normal detection signals (ST7). These detection signals by the synchronization detecting unit 114 are input into the reflection drive control unit 12.

At this time, the color wheel 31 and color wheel 32 synchronously rotate in a state in which the phase difference between the reference line 31g and the reference line 32g is maintained 30 degrees. If the elevation view for the color wheel 31 is as illustrated FIG. 23, the elevation view for the color wheel 32 becomes in a phase state as illustrated in FIG. 24.

Here, if the focused light ray L2 from the lamp source 2 is, for example, incident on the spot 31e near the center of the green filter segment 31b on the color wheel 31, the spot 32e on the color wheel 32, on which the green light ray L3 is incident, is on the same green filter segment 32d, and the green light ray L4 is transmitted intact. If the spot 31e is near the center of the blue filter segment 31c, because the spot 32e is on the blue filter segment 32c, the blue light ray L3 is transmitted intact. Moreover, if the spot 31e is near the center of the red filter segment 31a, because the spot 32e is on the red filter segment 32a, the red light ray L4 is transmitted intact.

Meanwhile, if the spot 31e is on the red filter segment 31a near the green filter segment 31b as illustrated in FIG. 23, the spot 32e on which the red light ray L3 incident, is on the green filter segment 32b on the color wheel 32 as illustrated in FIG. 24. In this case, the light ray L4 transmitted through the color wheel 32 is changed into a yellow light ray (hereinafter, referred to as "Y"). The light ray L4 is changed as illustrated in FIG. 19, because the area in which a transmission characteristic curve 31A of the red filter segment is overlapped with a transmission characteristic curve 31B of the green filter segment, lies between color wavelengths of 570 nm and 600 nm, which corresponds to the wavelength of the yellow light ray. Based on the same principle, if the spot 31e is on the green filter segment 31b near the blue filter segment 31c, the spot 32e on which the green light ray L3 incident, is on the blue filter segment 32c; in this case, the light ray L4 transmitted through the color wheel 32 is changed into a cyan light ray (hereinafter, referred to as "C"). Based on the same principle, if the spot 31e is on the blue filter segment 31c near the red filter segment 31a, the spot 32e on which the blue light ray L3 incident, is on the red filter segment 32a; in this case, the light ray L4 transmitted through the color wheel 32 is changed into a magenta light ray (hereinafter, referred to as "M").

If the color transmission characteristics of the color wheel 31 and the color wheel 32 in Embodiment 3 are superposed when those phases are different 30 degrees from each other, the combined characteristics are equal to color transmission characteristics of a color wheel that consists of a yellow filter segment, a cyan filter segment, and a magenta filter segment, in addition to a red filter segment, a green filter segment, and a blue filter segment as illustrated in FIG. 25, because the area of each of the filter segments on the first color wheel 31 is proportionally related, regardless of the wheel diameter, to the segment area with the same color on the color wheel 32.

As described above, in Embodiment 3, the images of each of R, Y, G, C, B, and M colors are sequentially displayed in one $60^{th}$ of a second on the images displayed on the screen, because the color wheel illustrated in FIG. 25 has color transmission characteristics in which each of color filter segments is sequentially placed in the light path in a period of one field.

In general, though a method of mixing any two of R, G, and B color light rays on a screen has been used as a method of displaying Y, C, and M color light rays, for example, when the Y light ray is displayed by mixing the G light ray and the R light ray, a light ray transmitted through the green filter segment has characteristics of light rays transmitted through not only the G filter but also part of the Y filter and the C filter segments, according to the transmission characteristic curve 31B of the green filter segment illustrated in FIG. 19. Therefore, when this light ray is mixed with the R light ray on the screen shortly after the light ray being projected onto the screen, a phenomenon has occurred in which the color repeatability of the Y light ray of the image displayed on the screen is deteriorated, because color purity of the Y light ray is deteriorated by the C light ray that is partly transmitted. The same phenomena have also occurred in cases of the C light ray and the M light ray, which are other complementary colors.

In the projection-type image displaying apparatus configured as described above, because the apparatus has the first color wheel 31 and the second color wheel 32 that are configured with three primary color filter segments having an equal distribution, and the synchronizing device varies the phases of the first color wheel 31 and the second color wheel 32 to come to a predefined value, so that the color wheels can be effectively changed into a color wheel having Y, C, and M color transmission characteristics, the time-divisional patterns for the colored light rays that are incident on the reflection display device can be made variable. Thereby, Y, C, and M colors in high purity can be reproduced by projecting intact Y, C, and M light rays onto the screen without mixing colors on the screen.

In the above Embodiment 3, though the apparatus is explained on a case in which each of the three primary color filter segments has an center angle of 120 degrees, as far as each of the color filter segments on the first color wheel is proportionally related to the each of filter segments with the same color on the second color wheel, the angle is not limited to 120 degrees because the same effect can be obtained.

Embodiment 4

In Embodiment 1 through Embodiment 3, though the optical projection apparatus having two color wheels and the projection-type image displaying apparatus having the optical projection apparatus are explained, the apparatus may be configured to include three or more than three color wheels, in which the synchronizing device 11 controls the synchronous rotations and the phases of those color wheels, because the same effect of the present invention can be realized as far as the color transmission characteristics that are different from the color transmission characteristics of one color wheel, are obtained by varying the phases of the color wheels.

What is claimed is:
1. An optical projection apparatus comprising:
   a light source for emitting a light ray;
   a plurality of color wheels each including filter segments for transmitting, in accordance with color transmission characteristics thereof, the light ray emitted from the light source;

a reflection display device for reflecting, while modulating or switching, the light ray transmitted through the plurality of color wheels; and a projection lens for projecting the light ray reflected from the reflection display device, wherein the plurality of color wheels comprises a first color wheel and a second color wheel; and the first color wheel includes three primary color filter segments and a white filter segment;

the second color wheel consisting essentially of a white filter segment and a single colored filter segment consisting essentially of any one of the three primary color filter segments on the first color wheel; and the area of the white filter segment on the first color wheel is proportionally related to the area of the single colored filter segment on the second color wheel.

2. An optical projection apparatus according to claim 1, wherein the area of the colored segment in the second color wheel is proportionally related to the area of the segment, which composes the first color wheel, colored with same color of the colored segment in the first color wheel.

3. An optical projection apparatus according to claim 2, wherein an area in the second color wheel other than the colored segment is colored white.

4. An optical projection apparatus according to claim 1, wherein the area of the white filter segment on the first color wheel is identical with the area of the colored filter segment on the second color wheel.

5. An optical projection apparatus according to claim 2, wherein the area of the colored segment in the second color wheel is identical with the area of the segment, which composes the first color wheel, colored with same color of the colored segment in the first color wheel.

6. An optical projection apparatus according to claim 1, wherein the light source emits a white light ray.

7. A projection type image displaying apparatus comprising:

the optical projection apparatus as recited in claims 1;

an image signal inputting unit for inputting image signals;

a synchronizing device for controlling rotation of the plurality of color wheels rotates synchronized with the image signals from the image signal inputting unit, and for varying the phase of the plurality of color wheels by the input unit of signals that change the picture quality of images displayed on a screen; and a reflection drive control unit for controlling the driving of the reflection display device based on control instructions from the synchronizing device.

8. A method of projecting an image, comprising:

emitting a light ray;

transmitting the light ray, in accordance with color transmission characteristics thereof, through a plurality of color wheels each including filter segments;

providing a reflection display device for reflecting, while modulating or switching, the light ray transmitted through the plurality of color wheels; and projecting the light ray reflected from a reflection display device, wherein the plurality of color wheels comprises a first color wheel and a second color wheel; and the first color wheel includes three primary color filter segments and a white filter segment;

the second color wheel consisting essentially of a white filter segment and a single colored filter segment consisting essentially of any one of the three primary color filter segments on the first color wheel; and the area of the white filter segment on the first color wheel is proportionally related to the area of the single colored filter segment on the second color wheel.

9. The method according to claim 8, wherein the area of the colored segment in the second color wheel is proportionally related to the area of the segment, which composes the first color wheel, colored with same color of the colored segment in the first color wheel.

10. The method according to claim 9, wherein an area in the second color wheel other than the colored segment is colored white.

11. The method according to claim 8, wherein the area of the white filter segment on the first color wheel is identical with the area of the colored filter segment on the second color wheel.

12. The method according to claim 9, wherein the area of the colored segment in the second color wheel is identical with the area of the segment, which composes the first color wheel, colored with same color of the colored segment in the first color wheel.

13. The method according to claim 8, further comprising: emitting a white light ray.

14. The method according to claim 8, further comprising: inputting image signals;

providing a synchronizing device for synchronizing the rotation of the plurality of color wheels with the image signals and varying the phase of the plurality of color wheels that change the picture quality of images displayed on a screen;

controlling the driving of the reflection display device based on control instructions from the synchronizing device.

* * * * *